(12) United States Patent
He

(10) Patent No.: US 8,520,785 B2
(45) Date of Patent: Aug. 27, 2013

(54) MULTIMODE RECEIVER WITH A TRANSLATIONAL LOOP FOR INPUT MATCHING

(75) Inventor: Xin He, Waalre (NL)

(73) Assignee: NXP B.V., Eindhoven (NL)

(*) Notice: Subject to any disclaimer, the term of this patent is extended or adjusted under 35 U.S.C. 154(b) by 131 days.

(21) Appl. No.: 13/204,059

(22) Filed: Aug. 5, 2011

(65) Prior Publication Data

US 2012/0033769 A1 Feb. 9, 2012

(30) Foreign Application Priority Data

Aug. 6, 2010 (EP) .................................... 10172142

(51) Int. Cl.
*H04B 1/10* (2006.01)

(52) U.S. Cl.
USPC ........... 375/350; 375/295; 455/126; 455/102; 455/341

(58) Field of Classification Search
USPC ................................................. 375/350, 295
See application file for complete search history.

(56) References Cited

U.S. PATENT DOCUMENTS

| | | | | |
|---|---|---|---|---|
| 7,983,632 B2* | 7/2011 | Zolfaghari | ..................... | 455/102 |
| 2005/0153670 A1* | 7/2005 | Shi et al. | ........................ | 455/126 |
| 2009/0274244 A1* | 11/2009 | Jensen | ........................... | 375/295 |
| 2010/0056097 A1* | 3/2010 | Liebman | ....................... | 455/341 |

OTHER PUBLICATIONS

Yanduru, N. "A WCDMA, GSM/GPRS/EDGE Receiver Front End without Interstage SAW Filter", IEEE Radio Frequency Integrated Circuits Symp., 4 pgs. (2006).

Darabi, H. "A Blocker Filtering Techniques for Saw-Less Wireless Receivers", IEEE J. of Solid-State Circuits, vol. 42, No. 12, pp. 2766-2773 (Dec. 2007).

Tenbroek, B. et al. "Single-Chip Tri-Band WCDMA/HSDPA Transceiver Without External SAW Filters and with Integrated TX Power Control," IEEE 2008 Solid-State Circuits Conf., pp. 202-203, 607 (2008).

Kaczman, D. et al. "A Single-Chip 10-Band WCDMA/HSDPA 4-Band GSM/EDGE SAW-less CMOS Receiver With DigRF 3G Interface and $\pi$dBm IIP2", IEEE J. of Solid-State Circuits, vol. 44, No. 3, pp. 718-39 (Mar. 2009).

Extended European Search Report for European Patent Appln. No. 10172142.1 (Jan. 13, 2011).

\* cited by examiner

*Primary Examiner* — Eva Puente

(57) ABSTRACT

A multimode receiver has a transconductance amplifier having an input terminal and adapted to receive a voltage RF signal and to deliver a current RF signal. The amplifier has a current mixer coupled to the transconductance amplifier and adapted to receive the current RF signal, the current mixer being adapted to combine the current RF signal with a signal generated by a local oscillator, the mixer generating an intermediate frequency signal having a frequency that equals a combination of a frequency of the current RF signal and a frequency of the local oscillator. A low-pass filter is coupled to the mixer and is adapted to generate a low-pass current signal. A transimpedance amplifier is coupled to the low-pass filter and is adapted to receive the low-pass current signal, the transimpedance amplifier being adapted to generate an intermediate frequency voltage signal proportional with the low-pass current signal. A first switch is adapted to receive a signal proportional with the intermediate frequency voltage signal at a first end, a second end being coupled to the input terminal and a second switch is coupled between the input terminal and a reference terminal. The first and second switches are mutually exclusive in an ON state in a specific mode of operation of the multimode receiver.

9 Claims, 2 Drawing Sheets

MULTIMODE RECEIVER WITH A TRANSLATIONAL LOOP FOR INPUT MATCHING

This application claims the priority under 35 U.S.C. §119 of European patent application no. 10172142.1, filed on Aug. 6, 2010, the contents of which are incorporated by reference herein.

FIELD OF THE INVENTION

The invention relates to a multimode receiver comprising
a transconductance amplifier having an input terminal and adapted to receive a voltage RF signal and to deliver a current RF signal;
a current mixer coupled to the transconductance amplifier and adapted to receive the current RF signal, the current mixer being further adapted to combine the current RF signal with a signal generated by a local oscillator, the mixer generating an intermediate frequency signal having a frequency that equals a combination of a frequency of the current RF signal and a frequency of the local oscillator;
a low-pass filter coupled to the mixer and adapted to generate a low-pass current signal; and
a transimpedance amplifier coupled to the low-pass filter and adapted to receive the low-pass current signal, the transimpedance amplifier being adapted to generate an intermediate frequency voltage signal proportional with the low-pass current signal.

BACKGROUND OF THE INVENTION

Receivers are widely used in modern technology devices, as portable devices, computers, phones, etc. Wireless communication devices form a large majority of applications using portable radio devices. Usually, the receivers (RX) are coupled with transmitters (TX) in modern communication devices.

In wireless communication one of the major challenges is that the RF receiver i.e. the receiver which handles the input radio frequency signals, should tolerate the strong out-of-band interference when they receive a weak wanted signal. For example, in WCDMA applications, TX and RX operate simultaneously. Due to limited TX-to-RX isolation in the TX band, it is a relatively large TX leakage in the TX band which in turn determine stringent RX out-of-band Input Intercept Point 3 (IIP3) and IIP2 requirements. These requirements are on top of the low noise figure requirement. In order to mitigate the out-of-band linearity requirement of the RX front-end, an inter-stage Surface Acoustic Wave (SAW) filter between the LNA and the mixer is usually added to further suppress the TX leakage, as it is shown in FIG. 1.

Similar situations are found in a GPS receiver where the GPS has to co-exist with WCDMA and other applications.

A lot of effort has already been made to eliminate this SAW filter, for lowering the cost and for reducing the size of the receiver. N. Yanduru et al., "A WCDMA, GSM/GPRS/EDGE receiver front end without interstage SAW filter," in *RFIC Symp. Dig.*, June 2006, pp. 77-80, employed a high Q LC tank circuit made with the help of the bonding wire at the LNA load to further attenuate the TX leakage, and thus improve the out-of-band IIP3 and IIP2. B. Tenbroek et al., "Single-Chip tri-band WCDMA/HSDPA transceiver without external SAW filters and with integrated TX power control," in *IEEE ISSCC Dig.*, February 2008, pp. 202-203, adopted a tuned Q-enhanced LC notch filter at the intermediate node of the LNA for rejecting the TX leakage. Both approaches need many inductors for different bands, and might be impractical for those WCDMA bands with small frequency duplex distance. Without extra inductor, H. Darabi, "A blocker filtering technique for SAW-less wireless receivers," *IEEE J. of Solid-State Circuits*, vol. 42, no. 12, pp. 2766-2773, December 2007, demonstrated a blocker filtering technique using a translational loop. However, it sacrifices the performance of power consumption and noise figure.

Recently, D. Kaczman et al., "A Single-Chip 10-Band WCDMA/HSDPA 4-Band GSM/EDGE SAW-less CMOS Receiver With DigRF 3G Interface and +90 dBm IIP2", *IEEE J. of Solid-State Circuits*, vol. 44, pp 718-739, March 2009, proposed an elegant solution using a single stage RF transconductance amplifier (TCA) followed by a passive current mixer whose switches are controlled by a Local Oscillator (LO) whose wave forms provides a 25% duty-cycle switching of the mixer. The circuit concept is presented in FIG. 2. With this schematic, a large out-of-band IIP3 is achieved because it is no high voltage swing at the output of TCA, and hence less linearity degradation compared with the conventional Low Noise Amplifier (LNA). Adding a low-pass filtering before converting to voltage by the trans-impedance amplifier (TIA), the total RX out-of-band IIP3 is significantly improved. Furthermore, switching with 25% duty-cycle LO leads to 3 dB higher conversion gain, better noise figure, and lower flicker noise than that switching with 50% duty-cycle LO in the mixer. Since the output of the RF TCA is a current, it is not possible to achieve input matching using shunt-shunt feedback as in the conventional voltage-mode LNA. Generally an inductive source degeneration circuit is adopted for improving the low noise figure, as shown FIG. 3 (*a*). For multi-standard applications, multiple inductors are needed, which determines a dramatic increase of the chip area. Common gate input is also used for input matching, as it is shown in FIG. 3 (*b*) and (*c*). However, these implementations provide a high noise figure.

Additional disadvantage for those input matching circuitry is that the trans-conductance of the TCA (or LNA) has to be fixed over different gain, resulting in high current consumption over all the gain settings.

SUMMARY OF THE INVENTION

Hence, it is a need, of a receiver to attenuate or to circumvent the above-mentioned disadvantages.

It is therefore an object of the invention to provide a multimode receiver as described in the introductory paragraph, the multimode receiver being characterized by
a first switch adapted to receive a signal proportional with the intermediate frequency voltage signal at a first end, a second end being coupled to the input terminal;
a second switch coupled between the input terminal and a reference terminal; the first switch and the second switch being mutually exclusive in an ON state in a specific mode of operation of the multimode receiver.

In this configuration, it is possible to use a high gain mode for the combination transconductance-mixer-transimpedance chain together with a translational loop by selecting the first switch ON and the second switch OFF. It is also possible to obtain a low gain mode by selecting the second switch to be ON and the first switch to be OFF.

In an embodiment of the invention the first switch is coupled via a feedback resistor to a second mixer, the second mixer being adapted to combine a signal proportional with the intermediate frequency voltage signal with the signal of the local oscillator and to generate a RF signal to the feedback resistor. The feedback resistor can be replaced by a source follower. This connection is particularly advantageous when one wishes to use an analog intermediate frequency signal. The second switch is coupled to the reference node via an input resistor.

Advantageously, the signal proportional with the intermediate frequency voltage signal is generated by the transimpedance amplifier (TIA).

In another embodiment of the invention, the signal proportional with the intermediate frequency voltage signal is generated by a digital to analog converter coupled to the transimpedance amplifier via an analog to digital converter, the analog to digital converter being coupled to the transimpedance amplifier. This connection is particularly advantageous when the feedback signal is taken from the digital domain of the multimode receiver.

Particularly, the analog to digital converter is coupled to the transimpedance amplifier via a variable gain amplifier, for obtaining a more accurate indication of an amplitude intermediate frequency signal.

Advantageously, the first and the second mixers comprises MOS switches, the MOS switches being controlled by non-overlapping periodical digital signals having a duty cycle of 25%.

In particular, the transconductance amplifier comprises a first differential transconductance amplifier and a second differential transconductance amplifier, said amplifiers being adapted to receive the current RF signal and to generate differential signals that a mutually in quadrature. This construction is useful in almost all modern communication receivers.

In another embodiment of the invention A multimode receiver as claimed in any previous claims, wherein the first mixer is either a down conversion or an up-conversion mixer and the second mixer is either an up conversion mixer or a down conversion mixer, respectively. This allows one to build the circuit either first up-converting the RF signal with the first mixer and then down-converting it with the second mixer back in the RF domain, or the other way around. These features increase the flexibility of use of a translational loop.

Throughout the description the combination of the first mixer, the second mixer and the feedback to the input of the circuit is denoted as translational loop.

The invention is defined by the independent claims. Dependent claims define advantageous embodiments.

The above and other advantages will be apparent from the exemplary description of the accompanying drawings in which

DETAILED DESCRIPTION OF EMBODIMENTS

Figure 1:
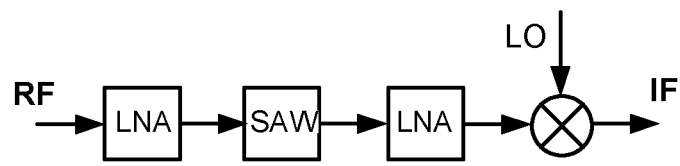
FIG. 1 depicts a receiver with inter-stage SAW filter to handle out-of-band blockers.
Figure 2:
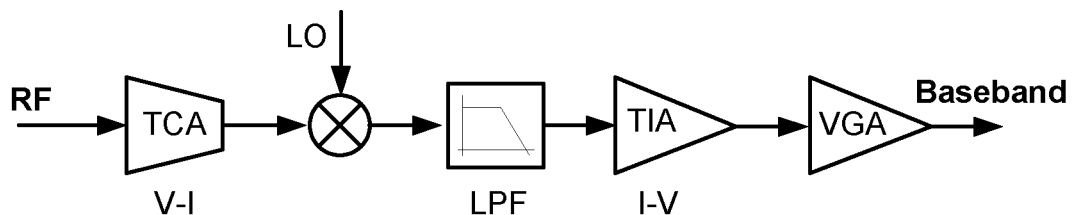
FIG. 2 depicts an interference-robust receiver using a low noise RF trans-conductance amplifier.
Figure 3:
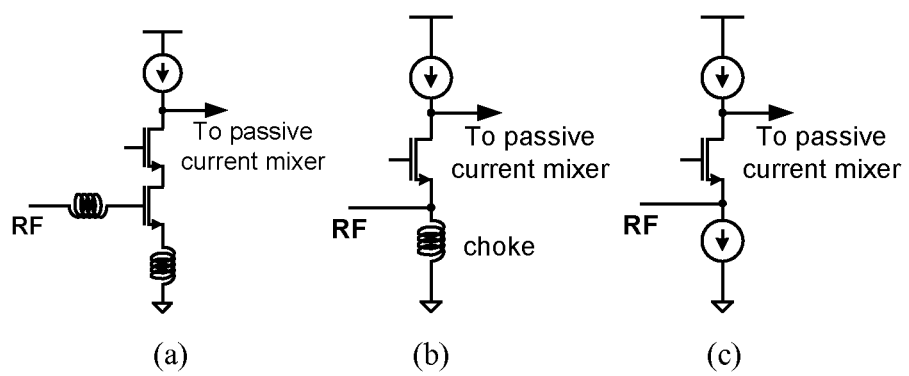
FIG. 3a depicts an RF TCA or LNA with input matching having an inductive source degeneration.
FIG. 3b depicts an RF TCA or LNA with input matching in common gate connection having a choke.
FIG. 3c depicts an RF TCA or LNA with input matching in common gate connection having a current source.
Figure 4:
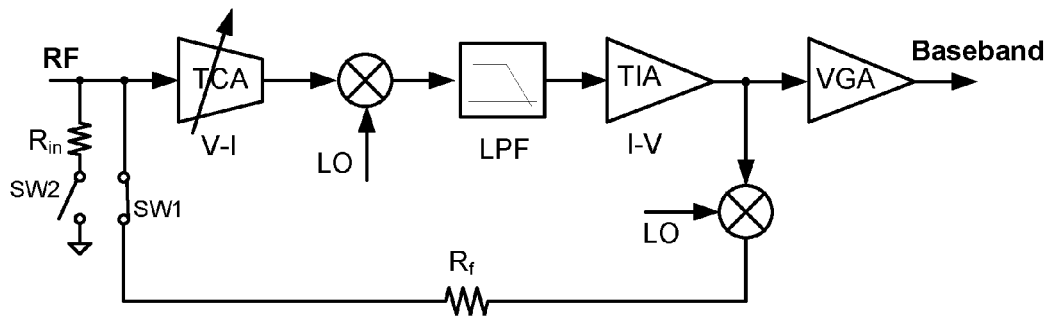
FIG. 4 depicts an interference-robust receiver using analog IF-to-RF translational loop for input matching, according to the invention.

FIG. 4 depicts an interference-robust receiver using analog IF-to-RF translational loop for input matching, according to the invention.

The multimode receiver shown in FIG. 4 comprises a transconductance amplifier TCA having an input terminal and adapted to receive a voltage RF signal RF and to deliver a current RF signal. A current mixer is coupled to the transconductance amplifier and receives the current RF signal. The current-mode down-conversion mixer down-converts the current RF signal by a local oscillator LO. The mixer generates an intermediate frequency (IF) signal having a frequency that equals the deviation of a frequency of the current RF signal and a frequency of the local oscillator. A low-pass filter LPF is coupled to the mixer generates a low-pass current signal. A transimpedance amplifier TIA is coupled to the low-pass filter and is receives the low-pass current signal, the transimpedance amplifier further generating an intermediate frequency voltage signal proportional with the low-pass current signal. The multimode receiver further comprises a first switch SW1 which turns on/off the translational loop, with the intermediate frequency voltage signal at a first end, a second end being coupled to the input terminal. A second switch SW2 is coupled between the input terminal and a reference terminal and it is used for input matching at low gain mode. The first switch (SW1) and the second switch (SW2) are mutually exclusive in an ON state in a specific mode of operation of the multimode receiver.

The first switch SW1 is coupled via a feedback resistor $R_f$ to an up-conversion mixer. The up-conversion mixer is used to up-convert a signal proportional with the intermediate frequency voltage signal with the signal of the local oscillator LO and to generate a signal to the feedback resistor $R_f$. The second switch SW2 is coupled to the reference node i.e. ground, via an input resistor $R_{in}$. The signal proportional with the intermediate frequency voltage signal is generated by the transimpedance amplifier TIA.

The receiver shown in FIG. 4 can be configured to operate in both high gain mode and low gain mode. When operating in high gain mode, SW1 is switched on while SW2 is switched off. The low-pass filtered IF outputs, is up-converted to RF, and then fed-back to the RF input, thus forming a IF-to-RF translational loop. The input matching is achieved by $$R_S = \frac{R_f}{G}$$

where $R_s$ is the source impedance to be matched i.e. the impedance of the generator which generates the RF signal, and G is the open loop gain at the TIA output.

In the low gain mode SW2 is switched on while SW1 is switched off. The resistor $R_{in}$ provides the input matching, at the price of 3 dB noise figure penalty. Because signal level is high at low gain mode, the increased noise floor is not an issue. Switching off the loop avoids the LO leakage issue in the low gain mode.

In comparison with conventional LNA using shunt-shunt feedback for input matching, the open loop gain can be much larger in the translational loop, resulting in larger feedback resistance and consequently lower noise. In implementation the noise contributed by the feedback resistance can be negligible at a gain higher above 30 dB. In addition, the transconductance of TCA at the low gain mode can be adapted to signal level, leading to reduced power consumption. Note that the feedback resistor can be replaced by a source follower.

Figure 5:
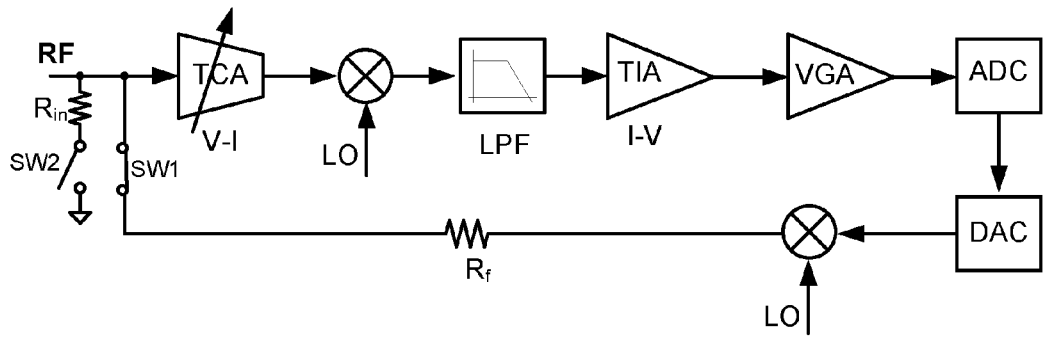
FIG. 5 depicts an interference-robust receiver using digital IF-to-RF translational loop for input matching; according to the invention.

FIG. 5 depicts an interference-robust receiver using digital IF-to-RF translational loop for input matching; according to the invention.

The signal proportional with the intermediate frequency voltage signal is generated by a digital to analog converter DAC coupled to the transimpedance amplifier TIA via an analog to digital converter ADC, the analog to digital converter being coupled to the transimpedance amplifier TIA. The analog to digital converter ADC is coupled to the transimpedance amplifier TIA via a variable gain amplifier VGA. The first and the second mixers comprise MOS switches, the MOS switches being controlled by non-overlapping periodical digital signals having a duty cycle of 25%.

The translational loop can be also implemented in a digital way. As it is shown in FIG. 5, the digitized IF information is converted to analog domain by the DAC, and then up-converted to RF before feeding it back to the input.

Figure 6:
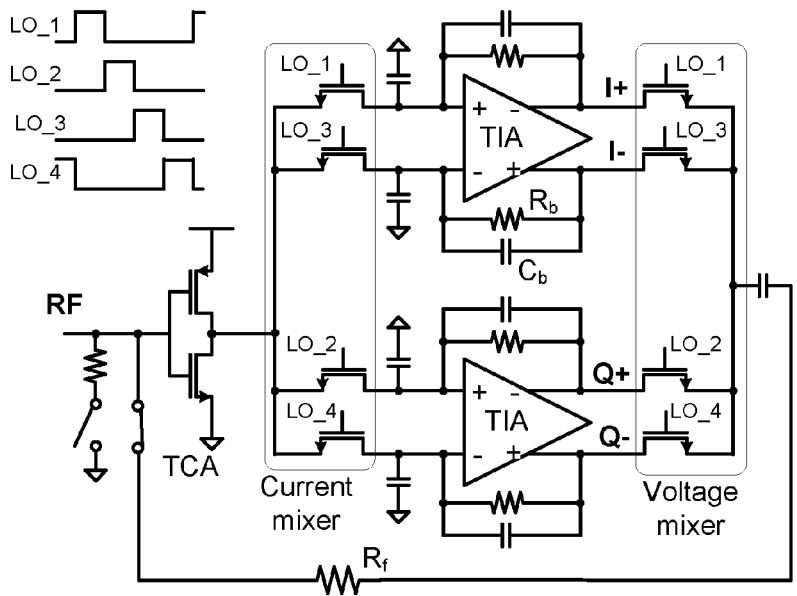
FIG. 6 depicts an embodiment of the interference robust receiver with analog IF-to-RF feedback input matching, according to the invention.

FIG. 6 depicts an embodiment of the interference robust receiver with analog IF-to-RF feedback input matching, according to the invention.

The multimode receiver comprises a first differential transconductance amplifier and a second differential transconductance amplifier, said amplifiers being adapted to receive the current RF signal and to generate differential signals that a mutually in quadrature.

Basically the transconductance amplifier TCA is an inverter type amplifier. The current output of the TCA is down-converted to an IF current by the passive current mixer driven by 25% duty-cycle LO. The capacitors coupled to the passive current mixer determine a first order low-pass filtering for the signals. The IF current outputs are then converted to quadrature I/Q voltage outputs signals using the transconductance amplifiers. The translational loop is formed by up-converting the IF voltage output and feeding back to the RF input. To reduce current, a passive voltage mixer driven by 25% duty-cycle LO is employed as an up-conversion mixer.

It should be pointed out that not limited to the receiver using transconductance amplifier TCA, the translational loop for input matching can be also applied to conventional receiver using a low noise amplifier (LNA) at the RF input.

It is remarked that the scope of protection of the invention is not restricted to the embodiments described herein. Neither is the scope of protection of the invention restricted by the reference numerals in the claims. The word "comprising" does not exclude other parts than those mentioned in the claims. The word "a(n)" preceding an element does not exclude a plurality of those elements. Means forming part of the invention may both be implemented in the form of dedicated hardware or in the form of a programmed purpose processor. The invention resides in each new feature or combination of features.

The invention claimed is:

1. A multimode receiver comprising
a transconductance amplifier having an input terminal and adapted to receive a voltage RF signal and to deliver a current RF signal;
a current mixer coupled to the transconductance amplifier and adapted to receive the current RF signal, the current mixer being further adapted to combine the current RF signal with a signal generated by a local oscillator, the mixer generating an intermediate frequency signal having a frequency that equals a combination of a frequency of the current RF signal and a frequency of the local oscillator;
a low-pass filter coupled to the mixer and adapted to generate a low-pass current signal;
a transimpedance amplifier coupled to the low-pass filter and adapted to receive the low-pass current signal, the transimpedance amplifier being adapted to generate an intermediate frequency voltage signal proportional with the low-pass current signal, wherein the multimode receiver includes;
a first switch adapted to receive a signal proportional with the intermediate frequency voltage signal at a first end, a second end being coupled to the input terminal; and
a second switch coupled between the input terminal and a reference terminal;
the first switch and the second switch being mutually exclusive in an ON state in a specific mode of operation of the multimode receiver.

2. A multimode receiver as claimed in claim 1, wherein the first switch is coupled via a feedback resistor to a second mixer, the second mixer being adapted to combine a signal proportional with the intermediate frequency voltage signal with the signal of the local oscillator and to generate a RF signal to the feedback resistor.

3. A multimode receiver as claimed in claim 2, wherein the second switch is coupled to the reference node via an input resistor.

4. A multimode receiver as claimed in claim 1, wherein the signal proportional with the intermediate frequency voltage signal is generated by the transimpedance amplifier.

5. A multimode receiver as claimed in claim 1, wherein the signal proportional with the intermediate frequency voltage signal is generated by a digital to analog converter coupled to the transimpedance amplifier via an analog to digital converter, the analog to digital converter being coupled to the transimpedance amplifier.

6. A multimode receiver as claimed claim 1, wherein the analog to digital converter is coupled to the transimpedance amplifier via a variable gain amplifier.

7. A multimode receiver as claimed in claim 1, wherein the first and the second mixers comprises MOS switches, the MOS switches being controlled by non-overlapping periodical digital signals having a duty cycle of 25%.

8. A multimode receiver as claimed in claim 1 wherein the transconductance amplifier comprises a first differential transconductance amplifier and a second differential transconductance amplifier, said amplifiers being adapted to receive the current RF signal and to generate differential signals that a mutually in quadrature.

9. A multimode receiver as claimed in claim 1, wherein the first mixer is one of a down conversion mixer and an up-conversion mixer and the second mixer is one of an up conversion mixer and a down conversion mixer, respectively.

* * * * *